Nov. 11, 1958 B. WOLFE 2,860,178
MULTIPLEX TRANSMISSION OF INTELLIGENCE
Filed Aug. 10, 1956
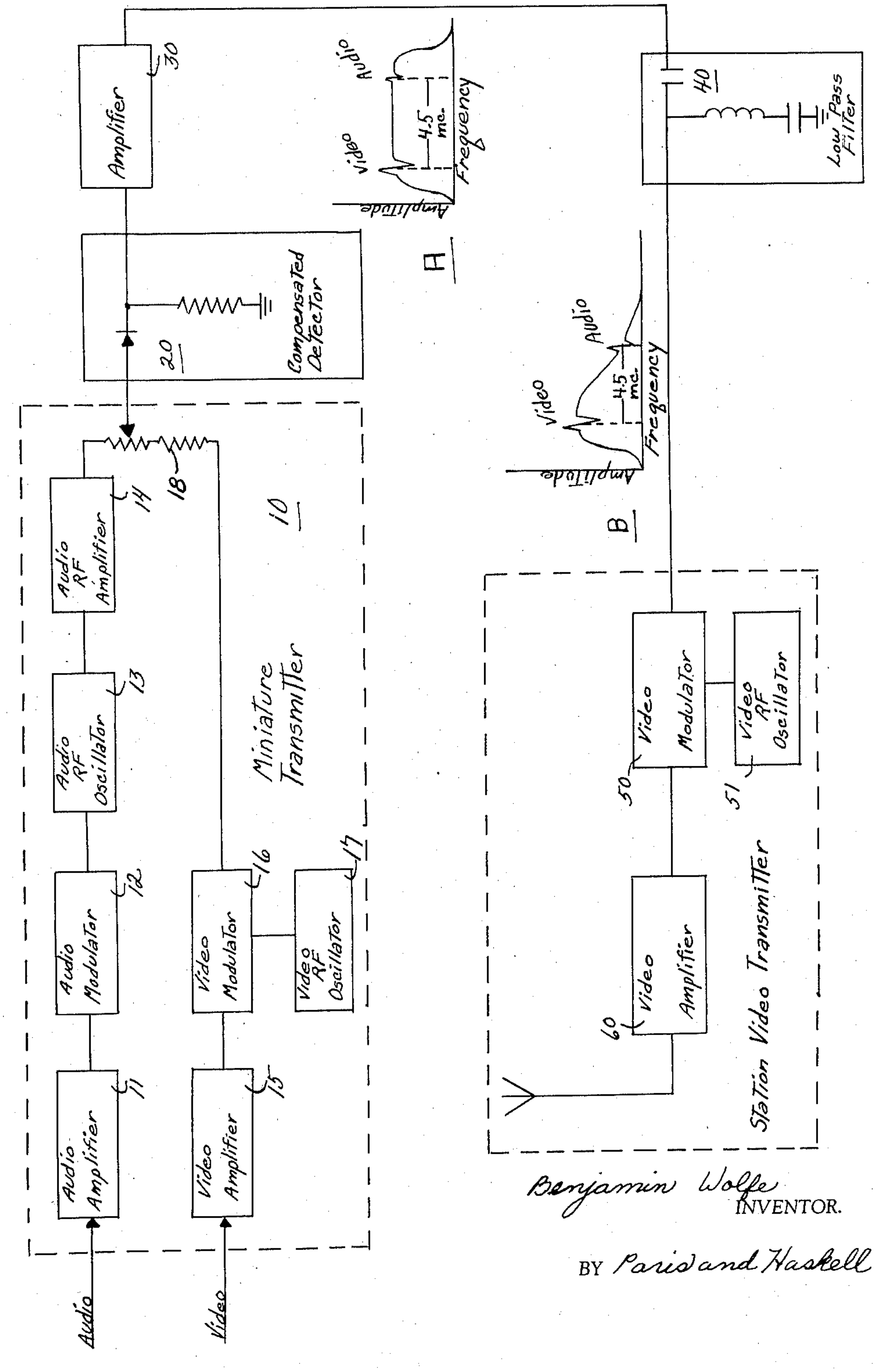
Benjamin Wolfe
INVENTOR.
BY Paris and Haskell United States Patent Office 2,860,178

Patented Nov. 11, 1958

2,860,178

MULTIPLEX TRANSMISSION OF INTELLIGENCE

Benjamin Wolfe, Baltimore, Md.

Application August 10, 1956, Serial No. 603,430

6 Claims. (Cl. 178—5.8)

The present invention is concerned with the multiplexing of intelligence, and more particularly with radio television transmission of frequency modulated audio and amplitude modulated video intelligence from a single transmitter, on a frequency and amplitude shared basis.

In standard commercial television broadcasting, it is the usual practice to employ two transmitters, one for the video intelligence signal and the other for the audio intelligence signal. In accordance with established regulations, the video intelligence is transmitted as an amplitude modulated carrier signal, and the audio as a frequency modulated carrier signal, the audio carrier being 4.5 mc. higher than the video carrier. The principal purpose of the present invention is not to provide a different mode of normal commercial television broadcasting, but to afford an inexpensive and readily utilizable stand-by system, for use in conjunction with the established equipment of a television broadcasting station, whereby upon temporary breakdown of one of the transmitters, broadcast of both the video and audio intelligence can be continued by transmission over the other transmitter. The resultant multiplexed transmission is in such form that it can be received by a standard television receiver without adjustment, in the same manner as the standard broadcast signals radiated from two transmitters.

It has been found that when video transmission is interrupted during a television broadcast, the continued reception of the audio intelligence enables the audience to maintain continuity of the program until the video intelligence is restored. Temporary breakdown of the video transmitter is therefore not a particularly serious problem. On interruption of audio intelligence, however, the reception of the video intelligence is not sufficient to enable the audience to maintain continuity of the program. It is therefore contemplated that the present invention will find its most beneficial application in its use as a stand-by for temporary audio transmitter failure during a television broadcast. Accordingly, in the following specific embodiment of the present invention, it is described with reference to applying the audio intelligence to the video transmitter, for multiplex transmission of both audio and video intelligence signals thereover. The resultant output is an amplitude and frequency shared transmission which is adapted to be received in the usual manner by a standard television receiver tuned to the usual channel of the transmitting station.

It is therefore one object of the present invention to provide a system for television broadcasting stations, or like transmitters, wherein a frequency modulated signal and an amplitude modulated signal may be transmitted by a single transmitter on an amplitude and frequency shared basis.

Another object of the present invention is to provide a stand-by system for transmitting a complete television signal, video and audio, over the video transmitter.

A further object of the present invention is to provide a stand-by system for transmitting a complete television signal, video and audio, over the video transmitter, wherein the radiated signal comprises an amplitude modulated video intelligence signal and a frequency modulated audio intelligence signal, with the audio carrier 4.5 mc. above the video carrier.

Other objects and advantages of the present invention will become apparent to those skilled in the art from a consideration of the following detailed exemplary embodiment of this invention, had in conjunction with the accompanying drawing, which is a functional block diagram illustrative of the present invention.

Referring to the drawing, a block diagram is there presented showing a system for combining audio and video intelligence for television transmission of both signals over the video transmitter, for such purposes as have been heretofore described. Numeral 10 indicates what may conveniently be a miniature transmitter, containing the usual audio and video signal modulation circuits usually employed preparatory to broadcasting intelligence. The input of these circuits are the unmodulated and separate audio and video intelligence signals normally obtained at a broadcasting station, in form for the feeding thereof to the standard separate audio and video transmitters. This unmodulated audio intelligence is introduced into the audio modulation train of the miniature transmitter comprising amplifier 11, modulator 12, R. F. oscillator 13, and amplifier 14. The output of amplifier 14 is a conventional frequency modulated R. F. signal, and may be of a usual television carrier frequency. For example, if this miniature transmitter were set for channel 3 television broadcast, the audio intelligence output of amplifier 14 would be a signal frequency modulated about 65.75 mc. Simultaneously, the aforestated video signals are fed into the video modulation train, comprising amplifier 15, modulator 16, and R. F. oscillator 17. The output of modulator 16 is a conventional amplitude modulated R. F. signal, and may be of a usual television carrier frequency. In the instance of this miniature transmitter being set for channel 3 television broadcast, the video intelligence output of amplifier 14 would be an amplitude modulated signal of 61.25 mc. The operation of these two modulation trains is the same as conventional broadcast transmitters, and it should be noted, that as is conventional, the audio output carrier is 4.5 mc. higher than the frequency of the video output carrier. It is desired to point out at this time that, for reasons that will become apparent subsequently, all that is of concern here in connection with the frequency of these signals, is that the outputs of the modulation trains be separated by 4.5 mc. as indicated, and the particular absolute carrier frequencies are of little concern. The foregoing specific frequencies of channel 3 operation are stated only for purposes of example, and are merely illustrative of the operation of the invention.

The outputs of the two modulation trains are heterodyned in a common output level circuit comprising dual potentiometer 18, from whence the resultant output is tapped and fed to a compensated detector 20, preferably flat within 1 db to 6 mc. Thus, the audio and video signals delivered by the miniature transmitter are respectively, a frequency modulated R. F. carrier and an amplitude modulated R. F. carrier separated by 4.5 mc. These two signals are beat against each other in the output of the miniature transmitter 10, and detected at 20 to eliminate the R. F. carriers, yielding the envelope of the original amplitude modulated carrier (video) and the difference frequency of the two carriers—a signal frequency modulated about 4.5 mc. (audio). These resultant signals are then amplified in amplifier 30, the output of which is indicated in frequency vs. amplitude plot A.

Since the ultimate broadcast of these video and audio signals over a single transmitter will be on a power sharing basis, it is preferred that the audio modulation at the station's main video transmitter be in reduced ratio to the video modulation. To facilitate this end, and for reasons described subsequently, the output of amplifier 30 is passed through a low pass filter 40, which may for example be a 4.75 mc. low pass filter. This filter causes the level of the audio intelligence signal to be dropped, as indicated in the frequency vs. amplitude plot B.

The signal output from filter 40 comprising the unmodulated video intelligence and the audio intelligence as a frequency modulation about 4.5 mc., is then passed to the station's main video transmitter, comprising R. F. modulator 50, R. F. oscillator 51, and R. F. amplifier 60. In the main video modulator 50, the video R. F. carrier is amplitude modulated by the video signals, whence this R. F. signal is amplified at 60 and transmitted. At the same time, in modulator 50, the video R. F. carrier is modulated by the audio 4.5 mc. frequency modulated signal, and the upper sideband of this modulation is amplified and passed by R. F. amplifier 60 for transmission. This upper sideband is a carrier 4.5 mc. above the original video carrier, and frequency modulated with the audio intelligence about this upper sideband frequency. The usual video modulator 50 accepts the two signals, since its bandwidth is normally approximately 5 mc. wide. In general, most present day video modulators employ soft clamping action in conjunction with color broadcasting. This type of clamp circuit provides sufficient impedance at the audio frequency, 4.5 mc. above the video carrier to nullify clamp action at the audio frequency. Thus there is transmitted from the station's main video transmitter, an amplitude and frequency shared signal, containing the video intelligence as an amplitude modulation of the station's established video carrier frequency, and containing the audio intelligence as a frequency modulation of the station's established audio carrier frequency. This transmission can be received by a standard television receiver in its normal operation when tuned to the usual channel of the transmitting station.

If desired, the percentage of video modulation may be reduced to 60%, and the audio carrier level adjusted to provide the remaining 40% modulation. Thus, the modulated amplifier and any following linear power amplifiers share the audio and video signals by that amount. While this percentage of video to audio carrier power provides a good signal to noise ratio, it requires some adjustment of the main video transmitter before the emergency system can be placed in operation. Since this signal is amplitude shared and a television transmitter is rated in terms of peak power output, the video power output should be reduced accordingly to prevent overloading of the modulator and the modulated amplifier, as well as the final power amplifier, if used. With the transmitter adjusted to handle these percentages or audio to video power, the plate currents drawn during "black time" may be considerably greater than normal. This is so because during black level with sync only, the synchronizing pulse occurs for 8% of the time, however, the audio modulation will still be applied thus increasing the average time considerably and causing an increase in average plate current in the modulator, the modulated amplifier and final linear amplifiers, if used. During experimental operation of the system with the 60–40 video to audio percentage ratio, it was found that the circuit breakers for the final power amplifier had to be set up during black time to prevent kick offs. With output final consisting of 5–6166 tubes and their normal black plate current being 2.5 amperes each, during black this plate current increased to 3.5 amperes per tube when the 60–40 ratio was used. In addition, this ratio permits a high percentage of audio signal through the normal stabilizing amplifiers and distribution amplifiers creating sound beat frequencies which are easily discernible on the operating monitors and are objectionable to operating personnel.

Since it was desirable to place the system in use with minimum adjustment to the transmitter, and to minimize the monitor cross talk interference without the addition of monitor sound traps, the sound carrier level was reduced accordingly. The carrier level was reduced to −9 db below the visual carrier level at the output of the miniature transmitter. An additional 6 db reduction is imposed on the sound carrier level by the use of the low pass filter. This filter is so designed that it is −6 db at 4.5 mcs. relative to the video frequencies. Thus the audio carrier level is down 15 db relative to the video carrier level. If the effective radiated power of the video transmitter is 316 kw., then in this amplitude shared system the audio power output will be approximately 10 kw. With this value of audio carrier, the modulator plate current increases from the normal black level value of 180 mils to 250–260 mils. At black levels, the modulated amplifier plate current as well as the final 50 kw. amplifier plate current does not increase sufficiently to be of any concern. While the signal to noise ratio is not as favorable with the decrease in the sound carrier level, the main video transmitter requires no adjustment other than a slight decrease in the percentage of video modulation: 10% or so, 75 to 80 percent modulation being satisfactory. In addition, the monitors throughout the station were not affected by the sound beat pattern which was objectionable.

The foregoing specific embodiment of the present invention is presented merely by way of example, to facilitate an understanding thereof, and variations and modifications of this embodiment will be apparent to those skilled in the art. Accordingly, such variations and modifications as are encompassed by the spirit and scope of the appended claims are contemplated as within the purview of the present invention.

I claim:

1. A system for television transmission of audio and video intelligence, comprising means for producing a first signal of a first frequency, amplitude modulated with video intelligence, means for producing a second signal, frequency modulated with audio intelligence about a frequency 4.5 mc. higher than said first frequency, means for heterodyning said two signals, means for detecting the video intelligence modulation envelope and the difference frequency of said two signals, said detected difference frequency being a frequency modulation of said audio intelligence about a frequency of 4.5 mc., and means for modulating a carrier with said detected video intelligence modulation envelope and said difference frequency, to provide an output at the frequency of said carrier amplitude modulated with said video intelligence, and an audio intelligence frequency modulated upper sideband of said carrier having a frequency of said carrier frequency plus 4.5 mc.

2. A system for radio television transmission of audio and video intelligence, comprising means for producing a first signal of a first frequency, amplitude modulated with video intelligence, means for producing a second signal, frequency modulated with audio intelligence about a frequency 4.5 mc. higher than said first frequency, means for heterodyning said two signals, means for detecting the video intelligence modulation envelope and the difference frequency of said two signals, said detected difference frequency being a frequency modulation of said audio intelligence about a frequency of 4.5 mc., and means for modulating a radio frequency carrier of video intelligence transmission frequency with said detected video intelligence modulation envelope and said difference frequency, to provide an output at the frequency of said carrier amplitude modulated with said video intelligence, and an audio intelligence frequency modulated upper sideband of said carrier having a frequency of said carrier frequency plus 4.5 mc.

3. A system for radio television transmission of audio and video intelligence, comprising means for producing a first signal of a first radio frequency, amplitude modulated with video intelligence, means for producing a second signal, frequency modulated with audio intelligence about a frequency 4.5 mc. higher than said first frequency, means for heterodyning said two signals, means for detecting the video intelligence modulation envelope and the difference frequency of said two signals, said detected difference frequency being a frequency modulation of said audio intelligence about a frequency of 4.5 mc., and means for modulating a radio frequency carrier of video intelligence transmission frequency with said detected video intelligence modulation envelope and said difference frequency, to provide an output at the frequency of said carrier amplitude modulated with said video intelligence, and an audio intelligence frequency modulated upper sideband of said carrier having a frequency of said carrier frequency plus 4.5 mc.

4. A method for radio television transmission of audio and video intelligence, comprising amplitude modulating a first signal of a first radio frequency with video intelligence, frequency modulating a second signal of a second radio frequency with audio intelligence, the second signal frequency being 4.5 mc. higher than the first signal frequency, heterodyning said two signals, detecting the video intelligence modulation envelope and the difference frequency of said two signals, said detected difference frequency being a frequency modulation of said audio intelligence about a frequency of 4.5 mc., and modulating a radio frequency carrier of video intelligence transmission frequency with said detected video intelligence modulation envelope and said difference frequency, to provide an output comprising one component at the frequency of said carrier, amplitude modulated with said video intelligence, and a second component being an audio intelligence frequency modulated upper sideband of said carrier having a frequency of said carrier frequency plus 4.5 mc.

5. A system for transmission from a single transmitter of an amplitude modulated carrier modulated by a first intelligence signal and a frequency modulated carrier modulated by a second intelligence signal, wherein the frequency of the firstmentioned carrier differs from that of the fundamental frequency of the second-mentioned carrier by a fixed frequency difference, comprising means for producing said first and second intelligence signals, means for producing a frequency modulated signal having a fundamental frequency of said fixed frequency difference modulated by said second intelligence signal, means for producing a signal having the frequency of said first-mentioned carrier, and means for modulating said last-mentioned signal with said first intelligence signal and said last-mentioned frequency modulated signal, to provide said first-mentioned carrier amplitude modulated by said first intelligence signal and, as a sideband thereof, said second-mentioned carrier frequency modulated by said second intelligence signal and having a fundamental frequency differing from that of said first mentioned carrier by said fixed frequency difference.

6. A system as defined in claim 5, wherein the frequencies of said carriers are radio frequencies, said first intelligence signal is a radio television video signal, said second intelligence signal is a radio television audio signal, said fixed frequency difference is 4.5 mc., and said sideband is an upper sideband.

References Cited in the file of this patent

UNITED STATES PATENTS

| | | |
|---|---|---|
| 2,103,847 | Hansell | Dec. 28, 1937 |
| 2,448,908 | Parker | Sept. 7, 1948 |
| 2,457,137 | Earp et al. | Dec. 28, 1948 |
| 2,534,111 | Dome | Dec. 12, 1950 |
| 2,539,440 | Labin et al. | Jan. 30, 1951 |
| 2,810,782 | Hester | Oct. 22, 1953 |